(12) United States Patent
Challener et al.

(10) Patent No.: US 8,442,367 B2
(45) Date of Patent: May 14, 2013

(54) GRATING FOR VCSEL COUPLING TO A HEAT ASSISTED MAGNETIC RECORDING HEAD

(75) Inventors: William Albert Challener, Glenville, NY (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 295 days.

(21) Appl. No.: 12/877,130

(22) Filed: Sep. 8, 2010

(65) Prior Publication Data

US 2012/0057440 A1    Mar. 8, 2012

(51) Int. Cl.
*G02B 6/34* (2006.01)

(52) U.S. Cl.
USPC ........ 385/37; 385/123; 369/112.27; 369/126; 369/100

(58) Field of Classification Search .................... 385/37, 385/123; 369/13.32, 112.27, 126, 100
See application file for complete search history.

(56) References Cited

U.S. PATENT DOCUMENTS

| | | | |
|---|---|---|---|
| 7,266,268 B2 | 9/2007 | Challener et al. | |
| 7,596,072 B2* | 9/2009 | Buechel et al. | 369/112.27 |
| 2004/0001394 A1 | 1/2004 | Challener et al. | |
| 2004/0001420 A1* | 1/2004 | Challener | 369/112.27 |
| 2009/0310459 A1 | 12/2009 | Gage et al. | |
| 2010/0208378 A1 | 8/2010 | Seigler et al. | |

\* cited by examiner

*Primary Examiner* — Ellen Kim
(74) *Attorney, Agent, or Firm* — Hollingsworth Davis, LLC

(57) ABSTRACT

An apparatus includes a waveguide including a core layer having curved edges shaped to reflect light to a focal point, and a grating positioned adjacent to or imbedded in the core layer, wherein at least a portion of the grating is positioned between the curved edges and adjacent to or imbedded in a portion of the core layer that is not traversed by light reflected from the curved edges. A data storage device that includes the apparatus is also provided.

21 Claims, 5 Drawing Sheets ically parallel sides 62 and 64,
and a second portion 66 with edges 68 and 70 shaped to direct
light, indicated by the arrows, to a focal point 72. In FIG. 2,
the first portion is shown with parallel sides. However, since-->

GRATING FOR VCSEL COUPLING TO A HEAT ASSISTED MAGNETIC RECORDING HEAD

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM), or lens, fabricated on a planar waveguide; and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

A laser diode can be used as the light source for HAMR. If a vertical cavity surface emitting laser (VCSEL) is used as the light source in HAMR, then a grating can be used to couple light from the VCSEL into the planar solid immersion mirror (PSIM) waveguide. The current limitation to using a VCSEL is that they don't supply enough power for current HAMR head design requirements (~50 mW). In order to obtain more laser power from the VCSEL, the output window of the VCSEL must be enlarged. However, there is only a finite amount of space on the end of the slider to contain both the PSIM and the grating. This limits the maximum size of the VCSEL output window.

There is a need for improved coupling of light from a VCSEL into a planar solid immersion mirror (PSIM) waveguide.

SUMMARY

In one aspect, the invention provides an apparatus including a waveguide including a core layer having curved edges shaped to reflect light to a focal point, and a grating positioned adjacent to or imbedded in the core layer, wherein at least a portion of the grating is positioned between the curved edges and adjacent to or imbedded in a portion of the core layer that is not traversed by light reflected from the curved edges.

DETAILED DESCRIPTION OF THE INVENTION

Figure 1:
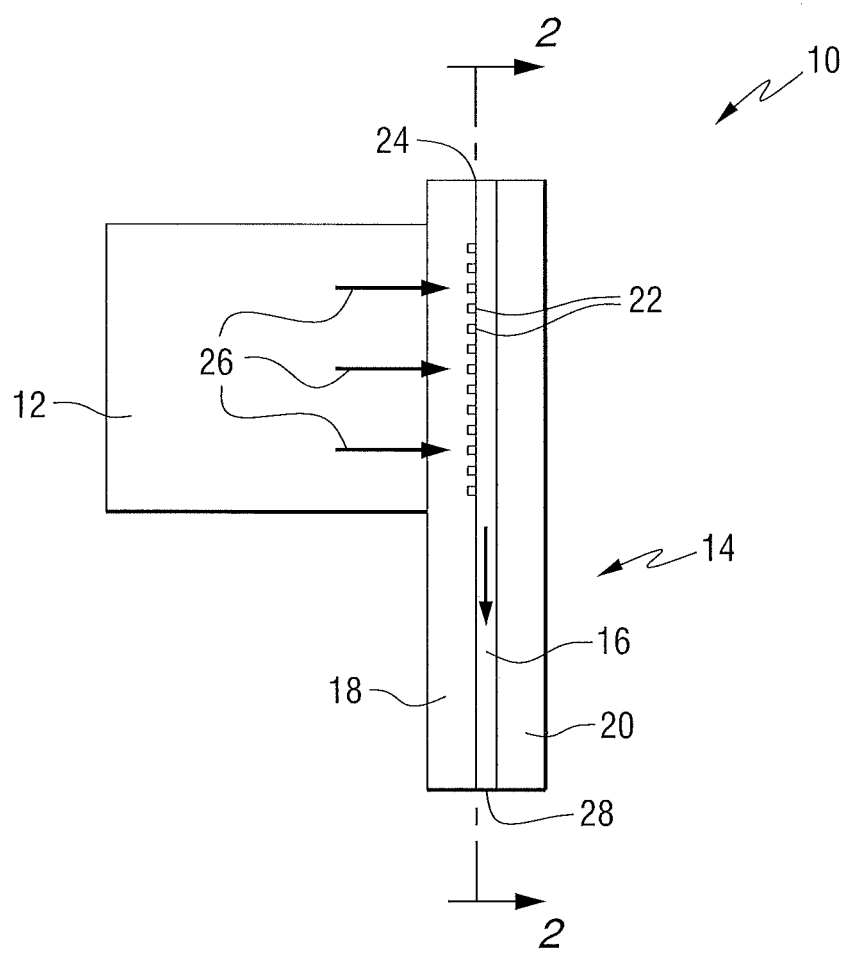
FIG. 1 is a schematic representation of a laser and waveguide assembly.

FIG. 1 is a schematic representation of a laser and waveguide assembly 10 in accordance with an embodiment of the invention. The assembly includes a laser 12, which can be for example a vertical cavity surface emitting laser (VCSEL) or another type of laser or source of electromagnetic radiation, positioned adjacent to a planar waveguide 14. In this description electromagnetic radiation, which can be for example visible, infrared, or ultraviolet light is generically referred to as light.

The waveguide includes a core layer 16 between first and second cladding layers 18 and 20. A grating 22 is positioned along an interface 24 between the first cladding layer and the core guiding layer, and can be adjacent to the core layer or imbedded in the core layer. Light indicated by arrows 26 is directed onto the grating and coupled into the waveguide 14. The waveguide can include shaped edges to focus the light to a focal point adjacent to an end 28 of the waveguide. When used in a recording head, the end 28 can be positioned adjacent to an air bearing surface of a slider.

Vertical cavity surface emitting lasers (VCSELs) are a type of semiconductor laser in which light is emitted out of a typically circular aperture at either the top or bottom of the device instead of the side as is done with edge-emitting lasers. The geometry of VCSELs reduces manufacturing costs, increases yield and has a number of other advantages including a narrower line width, no astigmatism, reduced sensitivity to feedback noise, etc. A VCSEL can be placed directly over the gratings.

While the laser is shown to be directly adjacent to the waveguide in FIG. 1, it should be understood that such relative placement is not required. In addition, other light sources and/or other means for directing light onto the grating are also encompassed by the invention. For example a light source may be located away from the waveguide and the light may be directed along a path toward the waveguide, wherein the path includes other optical components such as lenses or fiber optics.

In one aspect of the invention, to improve coupling from a light source, such as a VCSEL, to a parabolic solid immersion mirror (PSIM), the grating is structured to fit at least partially within a portion of the PSIM having curved edges without interfering with any of the reflected waveguide modes within the PSIM. The light cannot be reflected by the PSIM edges and then pass under the gratings, as this would cause a phase shift in the wavefront that would adversely affect the focusing. In order to prevent this, the end of the grating area can be tapered along a parabolic curve similar to the parabolic shape of the PSIM edges.

In order to get more power from a VCSEL into the PSIM, the area of the output window of the VCSEL can be enlarged to provide a light spot that extends over the grating.

Figure 2:
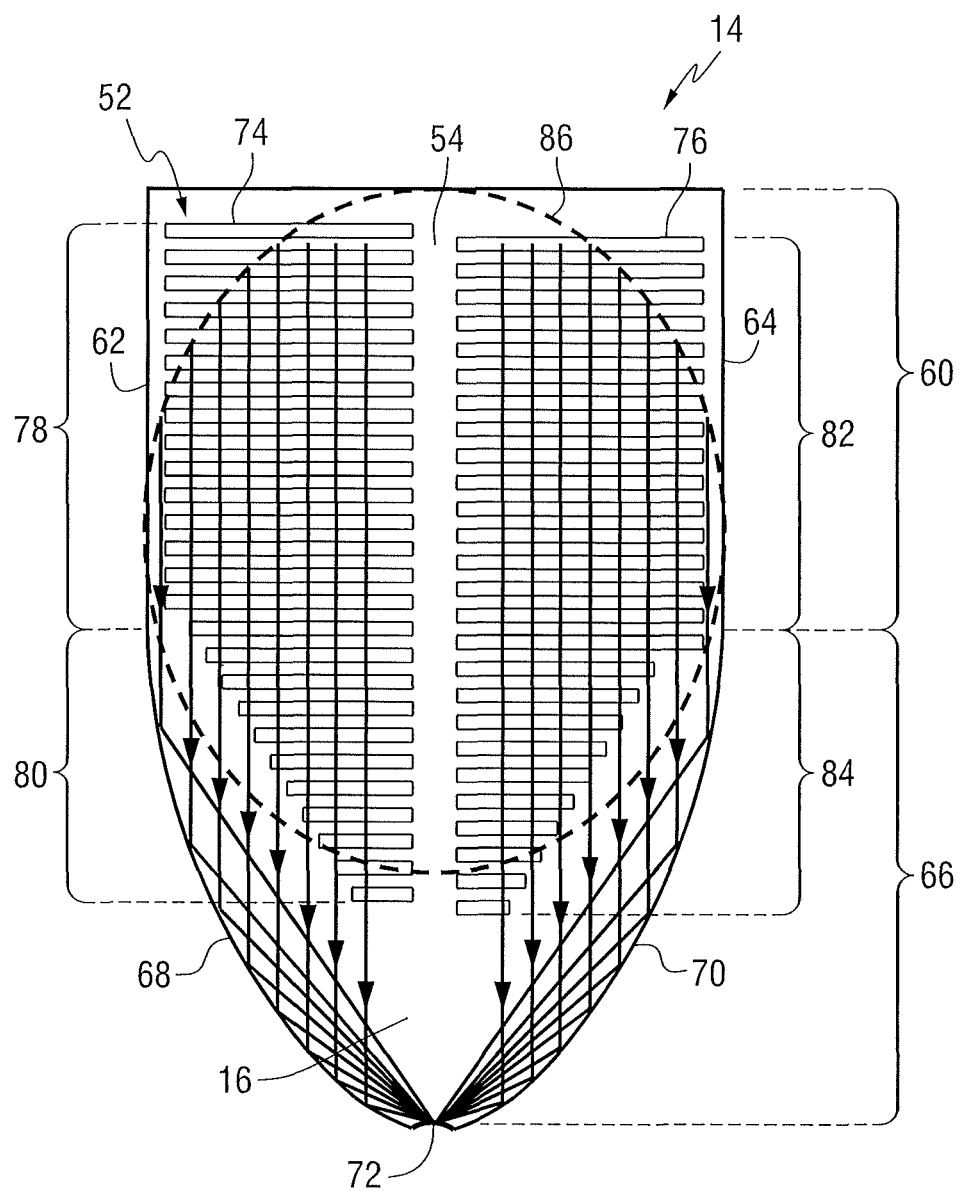
FIG. 2 is a cross-sectional view of a solid immersion mirror waveguide in the assembly of FIG. 1 taken along line 2-2.

FIG. 2 is a cross-sectional view of a solid immersion mirror waveguide 14 in the assembly of FIG. 1 taken along line 2-2. The waveguide includes a core guiding layer 16 having a first portion 60 shown with substantially parallel sides 62 and 64, and a second portion 66 with edges 68 and 70 shaped to direct light, indicated by the arrows, to a focal point 72. In FIG. 2, the first portion is shown with parallel sides. However, since the light is not directed to the sides of the first portion, the first portion need not have sides or walls of any particular shape or angle.

A grating coupler 52 includes two grating sections 74 and 76 that are positioned adjacent to or imbedded in the core guiding layer, and separated by a gap 54. Grating 74 includes a first portion 78 adjacent to the first portion of the core layer, and a second portion 80 adjacent to the second portion of the core guiding layer. Grating 76 includes a first portion 82 adjacent to the first portion of the core layer, and a second portion 84 adjacent to the second portion of the core layer. Light illustrated by oval 86, is directed onto the gratings and coupled into the waveguide. The second portions of the gratings are structured and arranged such that they do not overlap parts of the second portion of the core guiding layer that contains light reflected by the curved edges of the core guiding layer. The grating sections can be offset with respect to each other in directions parallel to the gap so that electric field component of the light in the two halves of the core layer adds at the focal point.

While FIG. 2 shows a grating having two sections separated by a gap, in an alternative embodiment, a single grating without a gap can be used. FIG. 2 shows an example in which the grating extends down into the PSIM. The VCSEL output light can be shaped into an elongated spot that extends down inside the PSIM as well, enabling a greater output power from the VCSEL. The grating is truncated as shown within the PSIM so that edges of the grating are separated from the PSIM side walls and do not extend over any of the marginal light rays reflected from the PSIM side walls. If the grating were to extend into these rays, it would cause some of the reflected light to be coupled back out of the waveguide and it would also modify the phase of the reflected wavefront, which are both undesirable.

Figure 3:
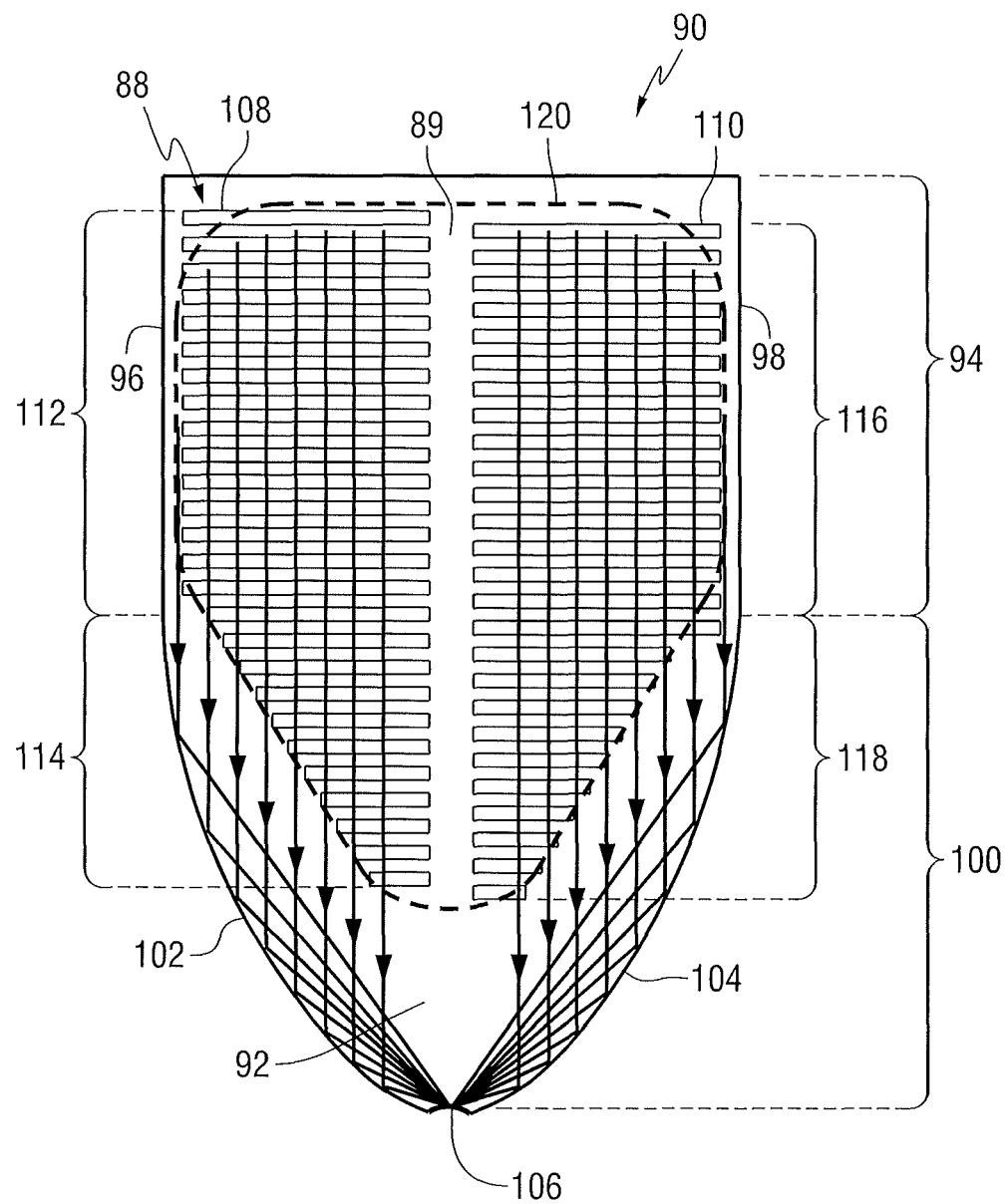
FIG. 3 is an elevation view of a solid immersion mirror waveguide in accordance with an embodiment of the invention.

The output of the VCSEL can have a custom shape to maximize the output power and light coupled into the gratings, such as an ellipse or "egg" shape. FIG. 3 is an elevation view of a solid immersion mirror waveguide in accordance with another embodiment of the invention. The waveguide 90 includes a core guiding layer 92 having a first portion 94 with substantially parallel sides 96 and 98, and a second portion 100 with edges 102 and 104 shaped to direct light, indicated by the arrows, to a focal point 106. In FIG. 3, the first portion is shown with parallel sides. However, since the light is not directed to the sides of the first portion, the first portion need not have sides or walls of any particular shape or angle.

A grating coupler 88 includes two grating sections 108 and 110 that are positioned adjacent to or imbedded in the core guiding layer and separated by a gap 89. Grating 108 includes a first portion 112 adjacent to the first portion of the core guiding layer, and a second portion 114 adjacent to the second portion of the core layer. Grating 110 includes a first portion 116 adjacent to the first portion of the core layer, and a second portion 118 adjacent to the second portion of the core layer. Light illustrated by dotted line 120, is directed onto the gratings and coupled into the waveguide. The second portions of the gratings are structured and arranged such that they do not overlap parts of the second portion of the core layer that contain light reflected by the curved edges of the core layer. While FIG. 3 shows a grating having two sections separated by a gap, in an alternative embodiment, a single grating without a gap can be used. In the embodiment of FIG. 3, the light beam is such that the light impinges on a larger portion of the gratings, than if the light beam had a simple oval shape as in FIG. 2. The light source can be configured to provide a spot of light having a shape that substantially conforms the shape of the grating. To achieve this spot shape, the output aperture of the VCSEL can be shaped to substantially match the shape of the gratings.

In other embodiments, the light source can be an edge emitting or horizontal cavity surface emitting laser. The grating can be shaped to substantially conform to the output light profile of the light source.

Figure 4:
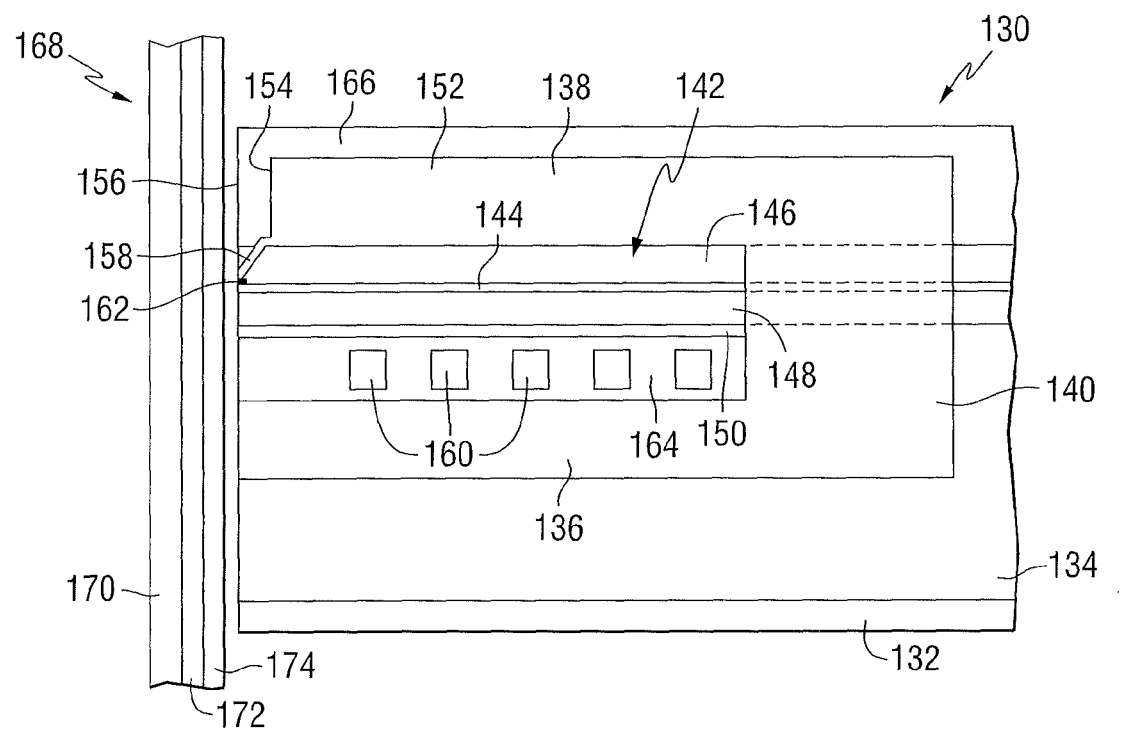
FIG. 4 is a cross-sectional view of a recording head.

FIG. 4 is a cross-sectional view of an example of a recording head for use in heat assisted magnetic recording. The recording head 130 includes a substrate 132, a base coat 134 on the substrate, a bottom pole 136 on the base coat, and a top pole 138 that is magnetically coupled to the bottom pole through a yoke or pedestal 140. A waveguide 142 is positioned between the top and bottom poles. The waveguide includes a core layer 144 and cladding layers 146 and 148 on opposite sides of the core layer. A mirror 150 is positioned adjacent to one of the cladding layers. The top pole is a two-piece pole that includes a first portion, or pole body 152, having a first end 154 that is spaced from the air bearing surface 156, and a second portion, or sloped pole piece 158, extending from the first portion and tilted in a direction toward the bottom pole. The second portion is structured to include an end adjacent to the air bearing surface 156 of the recording head, with the end being closer to the waveguide than the first portion of the top pole. A planar coil 160 also extends between the top and bottom poles and around the pedestal. A near-field transducer (NFT) 162 is positioned in the cladding layer 46 adjacent to the air bearing surface. An insulating material 164 separates the coil turns. Another layer of insulating material 166 is positioned adjacent to the top pole.

A recording medium 168 is positioned adjacent to or under the recording head 130. The recording medium 168 in this example includes a substrate 170, which may be made of any suitable material such as ceramic glass or amorphous glass. A soft magnetic underlayer 172 is deposited on the substrate 170. The soft magnetic underlayer 172 may be made of any suitable material such as, for example, alloys or multilayers of Co, Fe, Ni, Pd, Pt or Ru. A hard magnetic recording layer 174 is deposited on the soft underlayer 172, with the perpendicular oriented magnetic domains contained in the hard recording layer 174. Suitable hard magnetic materials for the hard magnetic recording layer 174 may include at least one material selected from, for example, FePt or CoCrPt alloys having a relatively high anisotropy at ambient temperature.

The optical waveguide in the recording head of FIG. 4 extends beyond the right-hand side of FIG. 4. A source of electromagnetic radiation (not shown in FIG. 4) transmits electromagnetic radiation to the waveguide. Then the waveguide transmits the electromagnetic radiation to the air bearing surface, as shown in FIG. 1. The light can be coupled to the optical waveguide by a grating as shown in FIG. 2 or 3. The light propagates through the optical waveguide toward the recording medium to heat a localized area of the recording layer. Although the recording head may be a perpendicular magnetic recording head and the storage medium may be a perpendicular magnetic recording medium, it will be appreciated that the invention may also be used in conjunction with other types of recording heads and/or recording mediums where it may be desirable to employ heat assisted recording.

Figure 5:
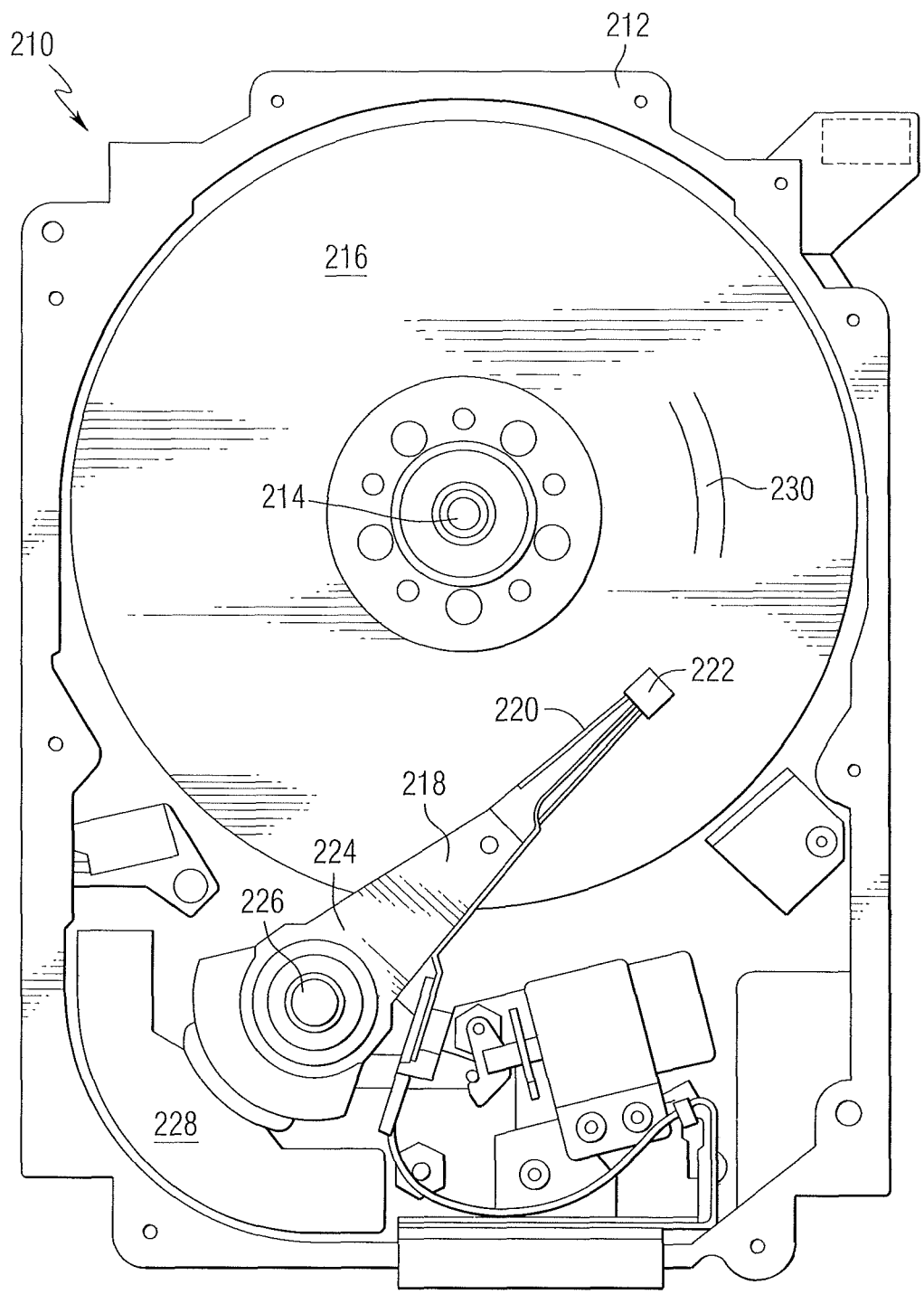
FIG. 5 is a pictorial representation of a data storage device in the form of a disc drive that can include a transducer in accordance with an aspect of this invention.

The recording heads if FIG. 4 above can be included in a data storage device, such as that illustrated in FIG. 5. FIG. 5 is a pictorial representation of a magnetic storage device in the form of a disc drive that can include a recording head constructed in accordance with the invention. The disc drive 210 includes a housing 212 (with the upper portion removed and the lower portion visible in this view) sized and configured to contain the various components of the disc drive. The disc drive 210 includes a spindle motor 214 for rotating at least one storage medium 216, which may be a magnetic recording medium, within the housing 212. At least one arm 218 is contained within the housing 212, with each arm 218 having a first end 220 with a recording head or slider 222, and a second end 224 pivotally mounted on a shaft by a bearing 226. An actuator motor 228 is located at the arm's second end 224 for pivoting the arm 218 to position the recording head 222 over a desired sector or track 230 of the disc 216. The actuator motor 228 is regulated by a controller, which is not shown in this view and is well-known in the art.

While the invention has been described in terms of several examples, it will be apparent to those skilled in the art that various changes can be made to the described examples without departing from the scope of the invention as set forth in the following claims. The implementations described above and other implementations are within the scope of the following claims.

What is claimed is:

1. An apparatus, comprising:
    a waveguide including a core layer having curved edges shaped to reflect light to a focal point, and
    a grating positioned adjacent to or imbedded in the core layer, wherein at least a portion of the grating is positioned between the curved edges and edges of the portion of the grating are spaced from the curved edges so that the portion of the grating is not traversed by light reflected from the curved edges.

2. The apparatus of claim 1, further comprising:
    a light source positioned to direct light onto the grating.

3. The apparatus of claim 2, wherein the light source IS mounted on a cladding layer positioned adjacent to the core layer.

4. The apparatus of claim 2, wherein the light source comprises a vertical cavity surface emitting laser.

5. The apparatus of claim 2, wherein the light source is configured to provide a spot of light having a shape that substantially conforms to the shape of the grating.

6. The apparatus of claim 2, wherein the light source is an edge emitting or horizontal cavity surface emitting laser.

7. The apparatus of claim 6, wherein the grating is shaped to substantially conform to an output light profile of the light source.

8. The apparatus of claim 1, wherein the curved edges have a parabolic shape.

9. The apparatus of claim 1, wherein the grating includes two sections with a gap between the sections.

10. The apparatus of claim 1, wherein the core layer is positioned substantially perpendicular to an air bearing surface.

11. An apparatus, comprising:
    a data storage medium;
    a transducer including a waveguide having a core layer with curved edges shaped to reflect light to a focal point and a grating positioned adjacent to or imbedded in the core layer, wherein at least a portion of the grating is positioned between the curved edges and edges of the portion of the grating are spaced from the curved edges so that the portion of the grating is not traversed by light reflected from the curved edges;
    a light source positioned to direct light onto the grating; and
    an arm for positioning the transducer with respect to the data storage medium.

12. The apparatus of claim 11, wherein the light source is mounted on a cladding layer positioned adjacent to the core layer.

13. The apparatus of claim 11, wherein the light source comprises a vertical cavity surface emitting laser.

14. The apparatus of claim 11, wherein the light source is configured to provide a spot of light having a shape that substantially conforms to the shape of the grating.

15. The apparatus of claim 11, wherein the curved edges have a parabolic shape.

16. The apparatus of claim 11, wherein the grating includes two sections with a gap between the sections.

17. The apparatus of claim 11, wherein the core layer is positioned substantially perpendicular to an air bearing surface.

18. The apparatus of claim 11, wherein the light source is an edge emitting or horizontal cavity surface emitting laser.

19. The apparatus of claim 18, wherein the grating shape substantially conforms to the output light profile of the light source.

20. The apparatus of claim 1, wherein the core layer comprises:
    a first portion with substantially parallel sides; and
    a second portion that includes the curved edges,
and wherein the grating comprises:
    a first portion adjacent to the first portion of the core layer; and
    a second portion that includes the portion of the grating positioned between the curved edges.

21. The apparatus of claim 20, wherein edges of the first portion of the grating are spaced from the substantially parallel sides of the first portion of the core layer by an amount that is less than the spacing of the edges of the second portion of the grating from the curved edges.

* * * * *